United States Patent
Artmeier et al.

(10) Patent No.: US 11,607,925 B2
(45) Date of Patent: Mar. 21, 2023

(54) METHOD FOR A THERMAL MANAGEMENT OF A MOTOR VEHICLE

(71) Applicant: Bayerische Motoren Werke Aktiengesellschaft, Munich (DE)

(72) Inventors: Felix Artmeier, Munich (DE); Niko Fontein, Unterschleissheim (DE); Torsten Frank, Vatterstetten (DE); Alexander Lichtenberger, St. Peter in der Au (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/775,803

(22) PCT Filed: Oct. 16, 2020

(86) PCT No.: PCT/EP2020/079179
§ 371 (c)(1),
(2) Date: May 10, 2022

(87) PCT Pub. No.: WO2021/094054
PCT Pub. Date: May 20, 2021

(65) Prior Publication Data
US 2022/0379687 A1 Dec. 1, 2022

(30) Foreign Application Priority Data
Nov. 14, 2019 (DE) ...................... 10 2019 130 803.8

(51) Int. Cl.
*B60H 1/00* (2006.01)
(52) U.S. Cl.
CPC ..... *B60H 1/00899* (2013.01); *B60H 1/00278* (2013.01); *B60H 2001/00307* (2013.01);
(Continued)

(58) Field of Classification Search
CPC ............ B60H 1/00899; B60H 1/00278; B60H 2001/00307; B60H 2001/00928; B60H 2001/00949
See application file for complete search history.

(56) References Cited

U.S. PATENT DOCUMENTS

| | | | |
|---|---|---|---|
| 10,814,696 B2* | 10/2020 | Tominaga | B60H 1/00914 |
| 11,065,936 B2* | 7/2021 | Gonze | B60H 1/00899 |
| 2022/0296848 A1* | 9/2022 | Brodsky | G05B 13/042 |

FOREIGN PATENT DOCUMENTS

| | | |
|---|---|---|
| DE | 10 2015 220 623 A1 | 4/2017 |
| DE | 10 2016 121 362 A1 | 5/2018 |

(Continued)

OTHER PUBLICATIONS

PCT/EP2020/079179, International Search Report dated Feb. 5, 2021 (Two (2) pages).

(Continued)

*Primary Examiner* — Ljiljana V. Ciric
(74) *Attorney, Agent, or Firm* — Crowell & Moring LLP

(57) ABSTRACT

A method for thermal management of a motor vehicle includes circulating of coolant, in a first operating state, at least in a motor cooling circuit through a series circuit that includes a motor circuit pump, an electric motor, and a low temperature (LT) radiator where the motor circuit pump is activated and where the coolant flows in a first direction through the LT radiator. The method further includes, time-shifted with respect to the first operating state, circulating of coolant, in a second operating state, at least in a chiller cooling circuit through a series circuit including a chiller, a chiller section pump, the motor circuit pump, and the LT radiator where the chiller section pump is activated, where the motor circuit pump is deactivated, where the coolant (Continued)

flows in a second direction through the LT radiator, and where the second direction is opposed to the first direction.

4 Claims, 2 Drawing Sheets

(52) U.S. Cl.
 CPC .............. *B60H 2001/00928* (2013.01); *B60H 2001/00949* (2013.01)

(56) References Cited

FOREIGN PATENT DOCUMENTS

| DE | 10 2017 220 376 A1 | 5/2019 | |
|---|---|---|---|
| DE | 102018101518 A1 * | 7/2019 | ............... B60H 1/00 |
| DE | 102019114581 A1 * | 2/2020 | ......... B60H 1/00278 |
| EP | 3 454 401 A1 | 3/2019 | |

OTHER PUBLICATIONS

German Search Report issued in German application No. 10 2019 130 803.8 dated Jul. 30, 2020, with Statement of Relevancy (Six (6) pages).

* cited by examiner

METHOD FOR A THERMAL MANAGEMENT OF A MOTOR VEHICLE

BACKGROUND AND SUMMARY OF THE INVENTION

The invention relates to a method for the thermal management of a motor vehicle.

Thermal management systems for electrified motor vehicles are known, which thermal management systems provide a heating capacity for a vehicle interior compartment by means of a heat pump functionality, in which existing heat sources, for example electric motor and high voltage store, are utilized. It is always desirable here for the thermal management system to be operated more efficiently and for the available heat sources to be utilized more efficiently, since an increase in efficiency directly improves the range of the vehicle during heating operation.

It is therefore an object of the present invention to increase the efficiency of a thermal management system.

In accordance with one exemplary embodiment of the invention, a method for the thermal management of a motor vehicle is provided, comprising the following steps: circulating of coolant, at least in a first operating state, in a motor cooling circuit through a series circuit comprising a motor circuit pump, an electric motor and a low temperature (LT) radiator, the motor circuit pump being activated and the coolant flowing in a first direction through the LT radiator, and, time-shifted with respect to this, circulating of coolant, in a second operating state, at least in a chiller cooling circuit through a series circuit comprising a chiller, a chiller section pump, the motor circuit pump and the LT radiator, the chiller section pump being activated, the motor circuit pump being deactivated and the coolant flowing in a second direction through the LT radiator, which second direction is opposed to the first direction. In this way, a thermal management system can be provided which can be operated even more efficiently, without additional components or valves being required.

In accordance with one exemplary embodiment of the invention, the method comprises a third operating state, comprising the following steps: circulating of coolant in a motor/chiller circuit through the electric motor, the chiller and the chiller section pump, and circulating at the same time of coolant in a high voltage store (HVS)/chiller circuit, coolant circulating through an energy store, the chiller, a chiller section pump and back to the energy store. In this way, a very large quantity of waste heat can be input into the chiller by way of only one activated pump.

In accordance with one exemplary embodiment of the invention, the method comprises a third operating state, comprising the following steps: circulating of coolant in a motor/chiller circuit through the electric motor, the chiller and the chiller section pump, and circulating at the same time of coolant in an HVS/chiller circuit, coolant circulating through an energy store, the chiller, a chiller section pump and back to the energy store. In this way, a very large quantity of waste heat can be input into the chiller by way of only one activated pump.

In accordance with one exemplary embodiment of the invention, the method comprises, furthermore, the following step in the first operating state: circulating of coolant in an HVS/chiller circuit, coolant being circulated through an energy store, the chiller, a chiller section pump and back to the energy store.

In accordance with one exemplary embodiment of the invention, a changeover is carried out between the third and the first operating state in a manner which is dependent on the sum of a waste heat from the electric motor and the energy store. As a result, the energy store can be used as a thermal store or buffer, in order to minimize the switching frequency and flow reversal frequency. In this case, the temperature of the energy store is increased and decreased within defined limits in the comfort range of the energy store.

In the following text, one preferred exemplary embodiment of the present invention will be described with reference to the appended drawings.

DETAILED DESCRIPTION OF THE DRAWINGS

Figure 1:
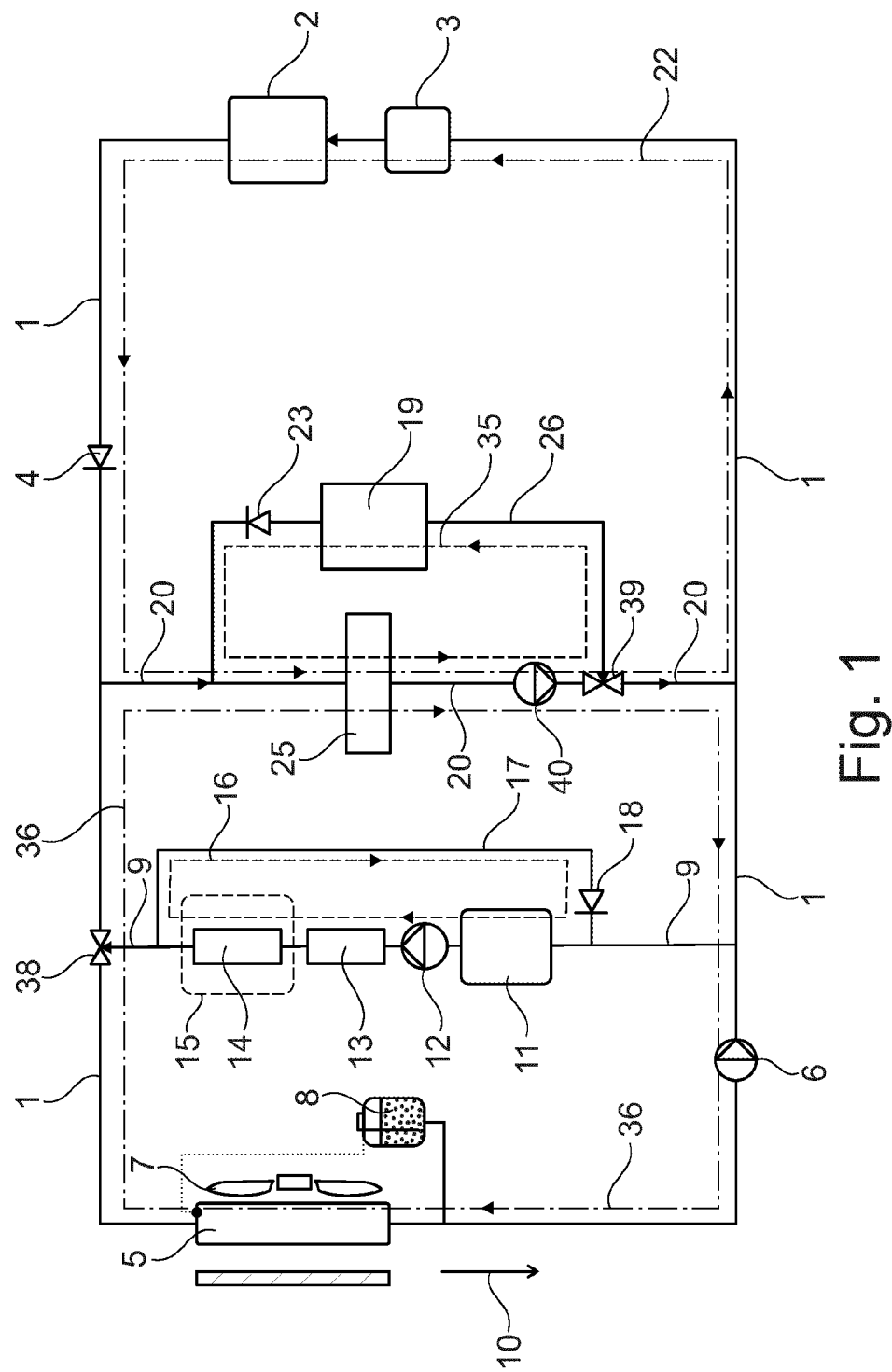
FIG. 1 diagrammatically shows heating and cooling circuits of a thermal management system in accordance with one exemplary embodiment of the invention.

FIG. 1 diagrammatically shows heating and cooling circuits of a thermal management system in accordance with one exemplary embodiment of the invention. The thermal management system is preferably installed in a motor vehicle (not shown), in particular a passenger car, for example a hybrid or electric vehicle. The thermal management system comprises a motor cooling circuit 1, in which an electric motor 2, an electronic power system 3, a check valve 4, a radiator/heating section valve 38, an LT radiator 5, and a motor circuit pump 6 are arranged. Coolant, for example a water which is mixed with additives, can be circulated in the motor cooling circuit 1. A throughflow of the LT radiator 5 can be permitted or prevented by means of the radiator/heating section valve 38, intermediate positions of the radiator/heating section valve 38 also being possible. During operation of the motor cooling circuit 1, in the case of an open radiator/heating section valve 38 and an activated motor circuit pump 6, in particular, the coolant flows through in this sequence: the motor circuit pump 6, the electronic power system 3, the electric motor 2 and the LT radiator 5. The LT radiator 5 is arranged such that it can be flowed through by ambient air, with the result that it can be cooled by way of a headwind. The LT radiator 5 is assigned a fan 7, in order to convey an air flow through the LT radiator 5 in addition to the headwind. In a known way, the motor cooling circuit 1 is assigned an equalizing vessel 8.

A heating section 9 is provided parallel to the electric motor 2 and the electronic power system 3. More precisely, the heating section 9 branches off from the motor cooling circuit 1 between the motor circuit pump 6 and the electronic power system 3. The heating section 9 opens into the motor cooling circuit 1 again between the electric motor 2 and the LT radiator 5. The radiator/heating section valve 38 or a control valve which is configured, in particular, as a ⅔-way valve is situated at the opening of the heating section 9 into the motor cooling circuit 1. Instead of the ⅔-way valve, one or more other valves, such as for example two shut-off valves, might be provided, however.

The heating section 9 comprises a water-cooled condenser 11, a heating section pump 12, an electrical heater 13, an interior compartment heat exchanger 14 and the radiator/heating section valve 38. The interior compartment heat exchanger 14 is arranged within an indicated air supply 15, for example an air flow duct, by way of which air is conducted into a passenger compartment (not shown) of the motor vehicle, with the result that the passenger compartment can be heated by means of the interior compartment heat exchanger 14. The radiator/heating section valve 38 is arranged in the heating section 9 downstream of the interior compartment heat exchanger 14, the latter is arranged downstream of the electrical heater 13, and the latter is arranged downstream of the condenser 11. The throughflow of the heating section 9 can be permitted or prevented by means of the radiator/heating section valve 38, intermediate positions of the radiator/heating section valve 38 also being possible.

In order to configure an electric duct heater (EDH) heating circuit 16 (illustrated by way of a dashed line), a heating return line 17 is provided which connects a downstream outlet of the interior compartment heat exchanger 14 to an upstream inlet of the condenser 11 in a fluidically conducting manner. A one-way valve 18 is provided in the heating return line 17, which one-way valve 18 permits only a flow in one direction and, to be precise, from the outlet of the interior compartment heat exchanger 14 toward the inlet of the condenser 11. The passenger compartment can be heated by means of the EDH heating circuit 16, by the coolant which is circulated by means of the heat pump 12 being heated at least by the electrical heater 13, and this thermal energy being output to the interior compartment heat exchanger 14. In other operating states, the coolant is heated in addition or as an alternative by the condenser 11, for example by way of waste heat from an electrical energy store 19 (HVS), the electric motor 2, etc., depending on what quantities of heat are available from these components.

A chiller section 20 branches off from the motor cooling circuit 1 between the radiator/heating section valve 38 and the electric motor 2. The chiller section 20 opens into the motor cooling circuit 1 again between the electronic power system 3 and the motor circuit pump 6.

The chiller section 20 comprises a chiller 25, a chiller section pump 40 and an HVS/chiller valve 39 or control valve. An HVS section 26 comprises a series circuit consisting of the electrical energy store 19 (HVS), a one-way valve 23 or check valve, and the HVS/chiller valve 39. The flow direction of the coolant in the HVS section 26 is defined by way of the one-way valve 23. A throughflow of the chiller section 20 and of the HVS section 26 can be permitted or prevented by means of the HVS/chiller valve 39, intermediate positions also being possible. The HVS/chiller valve 39 is configured, in particular, as a ⅔-way valve, but one or more different valves, such as for example two shut-off valves, could also be provided instead of the ⅔-way valve.

When the HVS/chiller circuit 35 is in operation, coolant is conveyed by means of the activated chiller section pump 40 from the energy store 19 to the chiller 25, and therefore waste heat from the energy store 19 is input into the chiller 25. After the throughflow of the chiller 25, the chiller section pump 40 conveys the coolant back again to the energy store 19, etc. More precisely, the chiller section pump 40 is arranged between the chiller 25 and the HVS/chiller valve 39. When the HVS/chiller circuit 35 is not in operation but the chiller section 20 is being flowed through by coolant, the coolant flow can be conveyed by means of the chiller section pump 40 along the chiller section 20 through the chiller 25.

Figure 2:
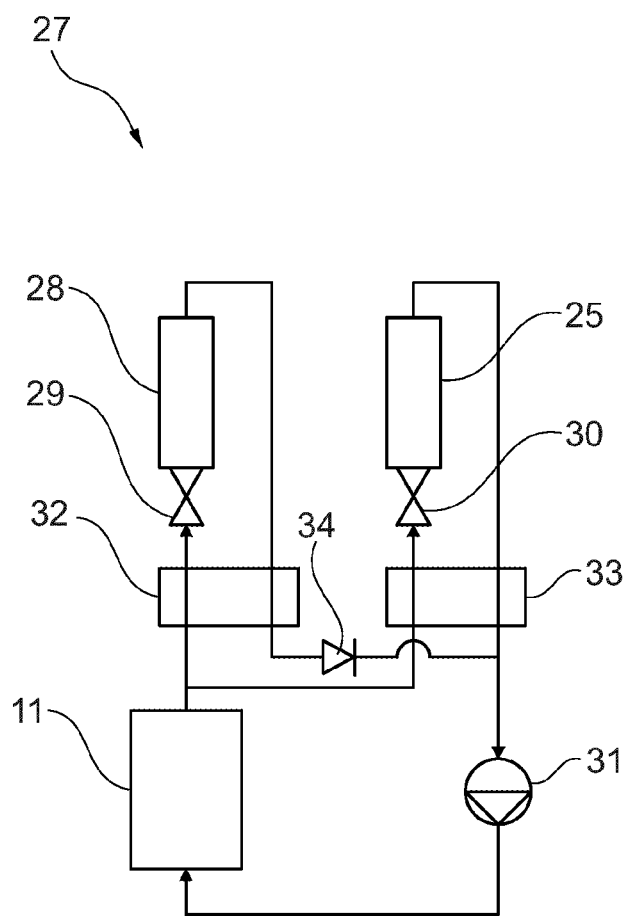
FIG. 2 diagrammatically shows a refrigeration circuit of the thermal management system in accordance with one exemplary embodiment of the invention.

FIG. 2 diagrammatically shows a refrigeration circuit 27 of the thermal management system in accordance with one exemplary embodiment of the invention. The refrigeration circuit 25 comprises the water-cooled condenser 11, the chiller 25 and an air conditioning evaporator 28 which is arranged in the air supply 15. A refrigerant, for example R134a, R1234yf, R1234ze or the like, circulates through these components. The chiller 25 is a heat exchanger or heat transfer means which transfers thermal energy between the refrigerant of the refrigeration circuit 27 and the coolant in the chiller section 20. To this end, the refrigerant and the coolant flow through the chiller 25 in a manner which is separated fluidically from one another. The air conditioning evaporator 28 is a heat exchanger or heat transfer means which transfers thermal energy between the refrigerant of the refrigeration circuit 27 and air which flows in the air supply 15. To this end, the refrigerant and the air flow through the air conditioning evaporator 28 in a manner which is separated fluidically from one another. The air conditioning evaporator 28 is connected in parallel to the chiller 25 in the refrigeration circuit 27. In order to set the cooling performance of the air conditioning evaporator 28, a self-regulating expansion valve 29 which can be shut off electrically is connected upstream of this air conditioning evaporator 28. An expansion valve 30 is connected upstream of the chiller 25. The interior compartment heat exchanger 14 and the air conditioning evaporator 28 are both arranged in the air supply 15. The passenger compartment can be heated, cooled and/or dehumidified by means of them.

Furthermore, the refrigeration circuit 27 comprises an electric compressor 31, by means of which the refrigerant can be compressed and conveyed. The refrigeration circuit 27 in FIG. 2 additionally comprises two inner heat exchangers 32, 33, of which one is assigned to the air conditioning evaporator 28 and the other is assigned to the chiller 25. The internal heat exchangers 32, 33 in each case comprise two chambers, through which flow can pass in thermal contact but in a manner which is separated fluidically from one another. Here, one chamber is connected upstream of the chiller/air conditioning evaporator, and the other chamber is connected downstream of the chiller/air conditioning evaporator. The chambers are flowed through in opposite directions and therefore configure a countercurrent heat exchanger. The internal heat exchangers are therefore flowed through in one chamber by the predominantly liquid refrigerant which comes from the compressor and in the other chamber by the predominantly gaseous refrigerant which comes from the chiller/air conditioning evaporator. Thermal energy is removed from the predominantly liquid refrigerant by way of the internal heat exchanger, which leads to an even higher percentage being liquefied. This energy is fed to the predominantly gaseous refrigerant, which leads to an even higher percentage evaporating and being present in gaseous form. This serves to increase the performance and efficiency of the chiller 25 and of the air conditioning evaporator 28. The internal heat exchangers 32, 33 are not absolutely necessary for the function of the refrigerant circuit 27. A check valve 34 or one-way valve is arranged downstream of the air conditioning evaporator 28. Further variants which are not shown result from the use of a plurality of chillers 25, a plurality of condensers 11 or a plurality of separate refrigeration circuits 27.

The refrigeration circuit 27 branches off downstream of the condenser 11 into the parallel sections, of which one leads to the air conditioning evaporator 28 and the other leads to the chiller 25. From this point, the internal heat exchanger 32, the expansion valve 29, the air conditioning evaporator 28, the internal heat exchanger 32, the check valve 34 and the compressor 31 are flowed through in the one section in this sequence. In the other section, the internal heat exchanger 33, the expansion valve 30, the chiller 25, the internal heat exchanger 33 and the compressor 31 are flowed through in this sequence. The parallel sections are combined again upstream of the compressor 31.

In the following text, some operating modes of this thermal management system are to be described.

In cooling cases, in which the LT radiator 5 is to be utilized for heat dissipation to the surrounding area, the motor cooling circuit 1 is operated in a first operating state. Here, the motor circuit pump 6 is activated or in operation, with the result that coolant is circulated in the motor cooling circuit 1 by means of the activated motor circuit pump 6, with the result that waste heat of the electric motor 2 and/or the electronic power system 3 is dissipated via the LT radiator 5 to the ambient air. In this first operating state, the coolant flows through the LT radiator 5 in a first direction. In addition, in the first operating state, the HVS/chiller circuit 35 (indicated by way of a dashed line) can be in operation, with the result that the waste heat of the energy store 9 is input into the chiller 25. In this HVS/chiller circuit 35, coolant is circulated through the energy store 19, the one-way valve 23, the chiller 25, the chiller section pump 40 and back to the energy store 19 along the HVS/chiller circuit 35, in order to input waste heat of the energy store 19 into the chiller 25 and to input this thermal energy via the chiller 25 and the refrigeration circuit 27 into the condenser 11. From the condenser 11, this thermal energy can then be input into the EDH heating circuit 16 and/or the heating section 9 (what is known as heat pump functionality). The energy store 19 can be cooled by way of this operating state, while the waste heat from the energy store 19 is fed via the chiller 25, the refrigeration circuit 27 and the condenser 11 to the interior compartment heat exchanger 14, in order to heat the passenger compartment in this way. Here, depending on the heating requirement, the electrical heater 13 is switched on or off.

In a second operating state, a chiller cooling circuit 36 is operated. The second operating state is time-shifted with respect to the first operating state. In other words, the first and second operating state are not carried out at the same time, but rather either the first operating state or the second operating state. In the second operating state which is described here, coolant is circulated along a chiller cooling circuit 36 which is illustrated by way of a dash-dotted line. In the chiller cooling circuit 36, the coolant is circulated through the chiller section 20, that is to say the chiller 25, the activated chiller section pump 40, the HVS/chiller valve 39, the non-activated motor circuit pump 6, the LT radiator 5, the radiator/heating section valve 38 and back to the chiller 25. Here, the circulation takes place in a second direction which is opposed to the first direction of the motor cooling circuit 1. That is to say, the LT radiator 5 is flowed through in the second direction which is opposed to the first direction. Here, the motor circuit pump 6 is bridged while it is not being operated. This is appropriate, for example, when the ambient temperature is warmer than the temperature of the chiller 25, with the result that heat from the surrounding area can be input via the LT radiator 5 into the chiller 25.

In the second operating state, a motor/chiller circuit 22 (illustrated by way of a dash-dotted line) is operated at the same time as the chiller cooling circuit 36. In the motor/chiller circuit 22, coolant is circulated by means of the activated chiller section pump 40 through the electric motor 2, the chiller section 20 (that is to say, the chiller 25 and the chiller section pump 40), the electronic power system 3 and back to the electric motor 2. In this way, the electric motor 2 and/or the electronic power system 3 can be cooled and the waste heat thereof can be input into the chiller 25 and therefore, in an analogous manner to the waste heat of the energy store 19 as described above, into the heating section 9 and/or into the EDH heating circuit 16 (heat pump functionality). The advantage of this second operating state is that a simple cooling circuit topology can be made possible by way of relatively few components/valves.

In the second operating state, the LT radiator 5 is flowed through in the reverse direction, but circulation flows are also conceivable, in which other components (electric motor 2, electronic power system 3 and/or chiller 25, etc.) are flowed through in the reverse direction.

An operating state is likewise possible, in the case of which only the motor/chiller circuit 22 is operated, without the chiller cooling circuit 36. While the motor/chiller circuit 22 is in operation, the chiller cooling circuit 36 can be switched in or off by means of the radiator/heating section valve 38.

If an operating state is desired, in the case of which only the chiller cooling circuit 36 is operated, without the motor/chiller circuit 22, a switch-off valve would have to be provided instead of the check valve 4 or in addition to the check valve 4 downstream of the electric motor 2 or upstream of the electronic power system 3. By way of this switch-off valve, the motor/chiller circuit 22 could then be switched on or off independently of the chiller cooling circuit 36.

In a third operating state, both the motor/chiller circuit 22 and the HVS/chiller circuit 35 are operated. Here, the chiller section pump 40 is in operation, and the HVS/chiller valve 39 is situated in an intermediate position. As a result, the waste heat from the electronic power system 3, the electric motor 2 and the energy store 19 is together input into the chiller 25. As a result, a very high quantity of waste heat can be input into the chiller 25. A further advantage of this operating state would be that the thermal buffer properties of the energy store 19 (in the case of corresponding regulation of the chiller section pump 40 and the HVS/chiller valve 39) can be utilized to keep the inlet conditions at the chiller 25 constant independently of rapid low changes in the drive train, or to keep the change speed low. This is advantageous for the operation of the refrigeration circuit 27.

Should this waste heat exceed a heat absorption capacity of the chiller 25, a switchover can be carried out to the first operating state. In the first operating state, only the waste heat of the energy store 19 is again input into the chiller 25, and the waste heat of the electric motor 2 and the electronic power system 3 is output to the surrounding area via the LT radiator 5.

Switching is carried out to and fro between the second and the third operating state in a manner which is dependent on the heat absorption capacity of the chiller 25 and the waste heat which is provided by the electronic power system 3, the electric motor 2 and the energy store 19. Therefore, the energy store 19 can be used as a thermal store, in order to minimize the switching frequency and flow reversal frequency. In this case, the temperature of the energy store 19 is increased and decreased within defined limits in the comfort range of the energy store 19.

While the invention has been illustrated and described in detail in the drawings and the preceding description, this description is to be understood to be exemplary and not restrictive, and the intention is not to restrict the invention to the disclosed exemplary embodiment. The mere fact that certain features are mentioned in different dependent claims is not intended to indicate that a combination of these features could not also be utilized advantageously.

LIST OF REFERENCE CHARACTERS

1 Motor cooling circuit
2 Electric motor
3 Electronic power system
4 Check valve
5 LT radiator
6 Motor circuit pump
7 Fan
8 Equalizing vessel
9 Heating section
10 First direction
11 Water-cooled condenser
12 Heat pump
13 Electrical heater
14 Interior compartment heat exchanger
15 Air supply
16 EDH heating circuit
17 Heating return line
18 One-way valve
19 Electrical energy store
20 Chiller section
22 Motor/chiller circuit
23 One-way valve
25 Chiller
26 HVS section
27 Refrigeration circuit
28 Air conditioning evaporator
29 Expansion valve
30 Expansion valve
31 Electric compressor
32 Internal heat exchanger
33 Internal heat exchanger
34 Check valve
35 HVS/chiller circuit
36 Chiller cooling circuit
37 Branching point
38 Radiator/heating section valve
39 HVS/chiller valve
40 Chiller section pump

What is claimed is:

1. A method for thermal management of a motor vehicle, comprising the steps of:
   circulating of coolant, in a first operating state, at least in a motor cooling circuit through a series circuit comprising a motor circuit pump, an electric motor, and a low temperature radiator, wherein the motor circuit pump is activated and wherein the coolant flows in a first direction through the LT radiator; and
   time-shifted with respect to the first operating state, circulating of coolant, in a second operating state, at least in a chiller cooling circuit through a series circuit comprising a chiller, a chiller section pump, the motor circuit pump, and the low temperature radiator, wherein the chiller section pump is activated, wherein the motor circuit pump is deactivated, wherein the coolant flows in a second direction through the low temperature radiator, and wherein the second direction is opposed to the first direction.

2. The method according to claim 1, further comprising a third operating state with the steps of:
   circulating of coolant in a motor/chiller circuit through the electric motor, the chiller, and the chiller section pump; and
   circulating, at a same time of circulating of coolant in the motor/chiller circuit, coolant in a high voltage store/chiller circuit with coolant circulating through an energy store, the chiller, the chiller section pump and back to the energy store.

3. The method according to claim 2, wherein a changeover is carried out between the third operating state and the first operating state in a manner which is dependent on a sum of a waste heat from the electric motor and the energy store.

4. The method according to claim 1, further comprising in the first operating state, circulating of coolant in a high voltage store/chiller circuit with coolant circulating through an energy store, the chiller, the chiller section pump and back to the energy store.

* * * * *